United States Patent
Kirkeby

(10) Patent No.: US 9,313,539 B2
(45) Date of Patent: Apr. 12, 2016

(54) METHOD AND APPARATUS FOR PROVIDING EMBEDDING OF LOCAL IDENTIFIERS

(75) Inventor: Ole Kirkeby, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 89 days.

(21) Appl. No.: 13/243,240

(22) Filed: Sep. 23, 2011

(65) Prior Publication Data
US 2013/0080571 A1    Mar. 28, 2013

(51) Int. Cl.
| G06F 15/16 | (2006.01) |
| H04N 21/414 | (2011.01) |
| H04N 21/4223 | (2011.01) |
| H04N 21/442 | (2011.01) |
| H04N 21/4788 | (2011.01) |

(52) U.S. Cl.
CPC ..... *H04N 21/41407* (2013.01); *H04N 21/4223* (2013.01); *H04N 21/44227* (2013.01); *H04N 21/4788* (2013.01)

(58) Field of Classification Search
USPC .................. 455/67.11, 41.2, 556.1
See application file for complete search history.

(56) References Cited

U.S. PATENT DOCUMENTS

| 7,551,913 | B1 | 6/2009 | Chien |
| 7,685,134 | B2 | 3/2010 | Myka et al. |
| 2006/0187228 | A1 | 8/2006 | Jung et al. |
| 2009/0276531 | A1 | 11/2009 | Myka et al. |
| 2010/0171805 | A1 | 7/2010 | Ron et al. |
| 2010/0191728 | A1 | 7/2010 | Reilly et al. |
| 2010/0291952 | A1* | 11/2010 | Gosset et al. ............. 455/466 |
| 2011/0050564 | A1 | 3/2011 | Alberth et al. |
| 2011/0102444 | A1 | 5/2011 | Matsumoto |
| 2011/0209221 | A1 | 8/2011 | Hanson et al. |

FOREIGN PATENT DOCUMENTS

| EP | 2352287 A1 | 8/2011 |
| GB | 2462163 A | 2/2010 |
| JP | 2009181210 A | 8/2009 |
| JP | 2011035657 A | 2/2011 |
| WO | WO 2005/043270 A | 5/2005 |
| WO | WO 2007/036842 A2 | 4/2007 |
| WO | WO 2008/048186 A1 | 4/2008 |
| WO | WO 2009/068089 A1 | 6/2009 |

OTHER PUBLICATIONS

International Search Report for related International Application No. PCT/FI2012/050797 dated Nov. 21, 2012, pp. 1-5.
Written Opinion for related International Application No. PCT/FI2012/050797 dated Nov. 21, 2012, pp. 1-8.
Extended European Search Report for corresponding European Patent Application No. 12833220.2 dated May 11, 2015, 6 pages.

* cited by examiner

Primary Examiner — Khaled Kassim
Assistant Examiner — Zhaohui Yang
(74) *Attorney, Agent, or Firm* — Ditthavong & Steiner, P.C.

(57) ABSTRACT

An approach is provided for providing embedding of local identifiers. The incorporation platform causes, at least in part, a detection, at a device, of presence of one or more other devices. Next, the incorporation platform processes and/or facilitates a processing of wireless signal information, from the one or more other devices, to determine one or more identifiers associated with the one or more other devices. Then, the incorporation platform causes, at least in part, an incorporation of at least one of the one or more identifiers in one or more captured content items.

15 Claims, 10 Drawing Sheets

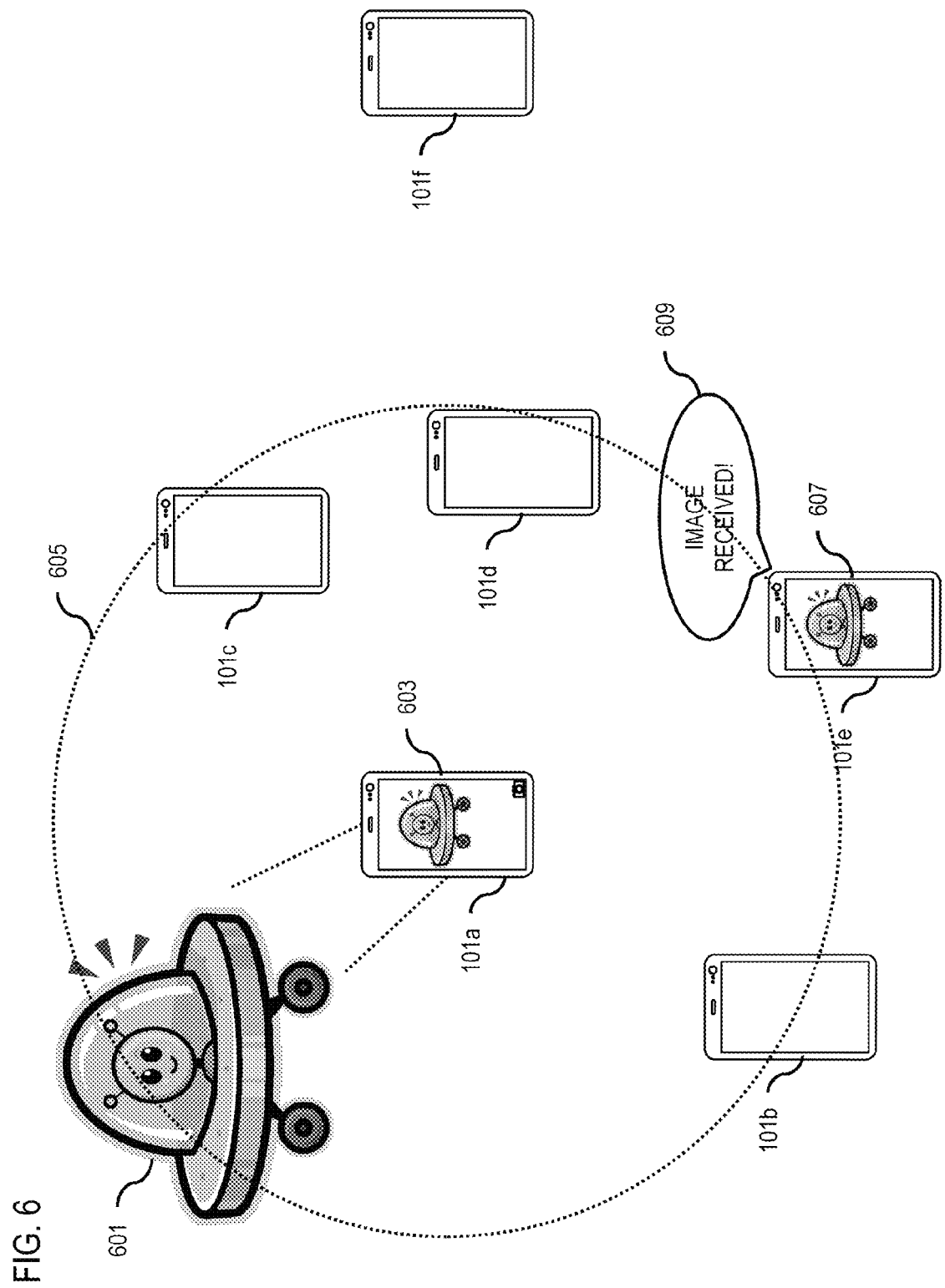

METHOD AND APPARATUS FOR PROVIDING EMBEDDING OF LOCAL IDENTIFIERS

BACKGROUND

Service providers and device manufacturers are continually challenged to deliver value and convenience to consumers by, for example, providing compelling network services. One area of interest has been the development of services and technologies for media tagging. For example, in recent years, service providers and device manufacturers have enabled tagging of media items (e.g., images, videos, etc.) with related information, which may be performed by a service, a device, or a user. Based on the tagging, the user as well as other users are able to search for these media items, for instance, by using related keywords in a search database. However, because the tagged information is not always accurate nor sufficiently detailed, users may find it difficult to locate, search for, or share media items, such as those with respect to particular events, events attended by those users, etc.

SOME EXAMPLE EMBODIMENTS

Therefore, there is a need for an approach for providing embedding of local identifiers.

According to one embodiment, a method comprises causing, at least in part, a detection, at a device, of presence of one or more other devices. The method also comprises processing and/or facilitating a processing of wireless signal information, from the one or more other devices, to determine one or more identifiers associated with the one or more other devices. The method further comprises causing, at least in part, an incorporation of at least one of the one or more identifiers in one or more captured content items.

According to another embodiment, an apparatus comprises at least one processor, and at least one memory including computer program code for one or more computer programs, the at least one memory and the computer program code configured to, with the at least one processor, cause, at least in part, the apparatus to detect, at a device, presence of one or more other devices. The apparatus is also caused to process and/or facilitate a processing of wireless signal information, from the one or more other devices, to determine one or more identifiers associated with the one or more other devices. The apparatus is further caused to incorporate at least one of the one or more identifiers in one or more captured content items.

According to another embodiment, a computer-readable storage medium carries one or more sequences of one or more instructions which, when executed by one or more processors, cause, at least in part, an apparatus to detect, at a device, presence of one or more other devices. The apparatus is also caused to process and/or facilitate a processing of wireless signal information, from the one or more other devices, to determine one or more identifiers associated with the one or more other devices. The apparatus is further caused to incorporate at least one of the one or more identifiers in one or more captured content items.

According to another embodiment, an apparatus comprises means for causing, at least in part, a detection, at a device, of presence of one or more other devices. The apparatus also comprises means for processing and/or facilitating a processing of wireless signal information, from the one or more other devices, to determine one or more identifiers associated with the one or more other devices. The apparatus further comprises means for causing, at least in part, an incorporation of at least one of the one or more identifiers in one or more captured content items.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6 is a diagram illustrating an applicability of embedding local identifiers, according to one example embodiment;

DESCRIPTION OF SOME EMBODIMENTS

Examples of a method, apparatus, and computer program for providing embedding of local identifiers are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
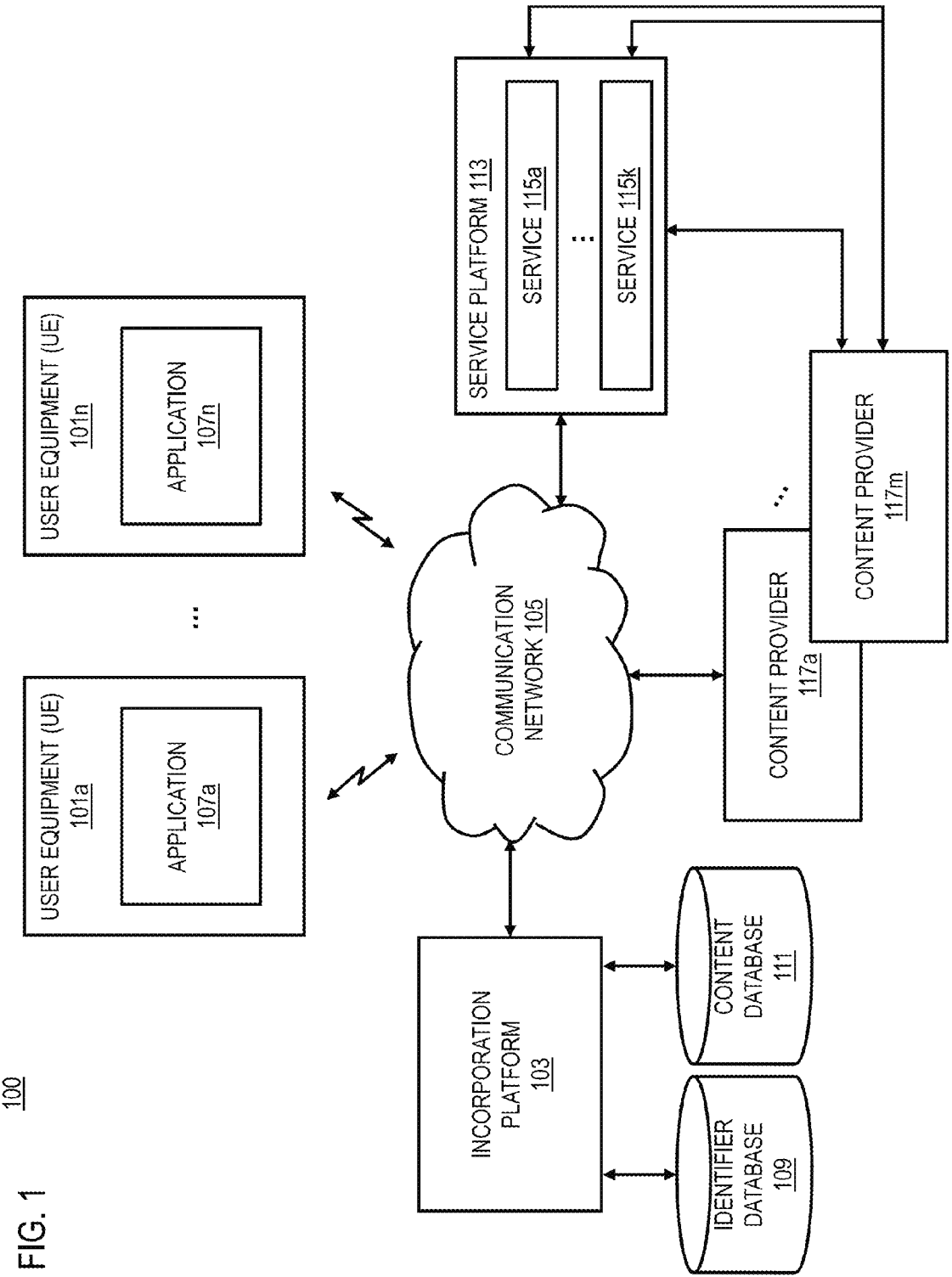
FIG. 1 is a diagram of a system capable of providing embedding of local identifiers, according to one example embodiment.

FIG. 1 is a diagram of a system capable of providing embedding of local identifiers, according to one embodiment. As mentioned, recent developments have enabled services, devices, and users to tag media items, such as images, videos, etc., with related information. For example, a user may tag an image with a short description along with the names of the people in the image known by the user. In addition, an associated service or device may, for instance, tag the image with location information as the image is captured by the device if such location information is available (e.g., via global position system (GPS)). As such, when the image along with other such images are uploaded to a search database, a sharing service, etc., other users may be able to locate these images based on the short description, the tagged names, or the location information. However, as indicated, the tagged information may be inaccurate or insufficiently detailed. In the above example, for instance, the user is only able to tag the image with information known to the user. Consequently, the tagged names may not include the names of people who appear in the image that the user does not remember or the names of people who do not appear in the image but attended the event at which the image was taken. Moreover, the tagging performed by the associated service or device may also be inaccurate or insufficiently detailed since there are many circumstances where GPS signals are not available and other location technologies may not be nearly as accurate. Accordingly, users may find it difficult to locate, search for, or share media items, such as those with respect to particular events, events attended by those users, etc.

To address this problem, a system 100 of FIG. 1 introduces the capability to incorporate local identifiers in content items. Although various embodiments are described with respect to sharing, it is contemplated that the approach described herein may be used in other situations utilizing embedded information in content items. Specifically, the system 100 may detect, at a device, presence of other devices within a geographical area of the device, and then process wireless signal information from the other devices to determine identifiers associated with the other devices. The identifiers may, for instance, include device identifiers, account identifiers, user identifiers, etc. As such, the system 100 may thus incorporate at least one of the determined identifiers in captured content items. By way of example, incorporation of these identifiers may be performed by the device itself or by an associated service (e.g., when the captured content items are uploaded along with a list of identifiers to be incorporated). The incorporation may further include storing the identifiers as metadata in the captured content items. The captured content items may include any media items (e.g., images, videos, audio recordings, games, maps, point of interests (POIs), etc.), any documents (e.g., reports, notes, messages, emails, etc.), or any combination thereof. Moreover, the captured content items may include content items captured at the device as well as content captured at various other devices. In addition, prior to incorporation, these identifiers may be encrypted (e.g., via a private and/or public key scheme). In this way, the identity of individuals, devices, and/or accounts associated with the identifiers may be protected to safeguard the privacy, the security, etc., of the associated individuals, devices, and/or accounts. It is noted, however, that encryption of the identifiers may not be necessary, for instance, in circumstances where the identity of the individuals as well as the captured content items are to be shared, or where the identifiers themselves provide sufficient privacy and security protections (e.g., randomly-assigned account identifiers associated with a service).

In one scenario, a number of users with mobile devices may be attending a wedding event (e.g., ceremony, reception, etc.). During the wedding event, many of the users may take images and videos of the wedding party and the other attendees using their mobile devices. Because the users may not initially know most of the attendees at the wedding event, they may not be able to tag their captured media (e.g., images, videos, etc.) with those individuals' names or send their captured media to those individuals using typical methods (e.g., direct email, multimedia messaging service (MMS), etc.). Nonetheless, the mobile devices may detect each other's presence since all of these mobile devices are at the same wedding event. The mobile devices may then determine the identifiers associated with respective other devices by processing the wireless signal information from these other devices. When the identifiers are obtained, the identifiers may be incorporated in the captured media based on the security and privacy settings of the respective users and/or mobile devices. Accordingly, the users may be able to search for the captured media using their own user, account, and/or mobile device identifiers (e.g., after the captured media have been uploaded) and share their captured media with other users based on the incorporated identifiers.

In another scenario, members of an organization may be attending an organizational meeting. During this meeting, one of the members may be designated to take meeting notes for the other members. Since the other members are within a vicinity of the designated member, their devices are detected by the device being used by the designated to take meeting notes. Thus, the identifiers associated the devices of the other members and/or the designated members are determined from the wireless signal information emitted from those devices and, thereafter, incorporated in the meeting notes. For a number of reasons, the organization may want to restrict the meeting notes to the attending members and/or devices. As such, when the meeting notes are uploaded to the organization website, the meeting notes may only be accessible using the identifiers of the respective devices and/or members at the meeting. As noted, the incorporated identifiers may be an encrypted version of the identifiers associated with the respective devices and/or members at the meeting. In this way, each of the identifiers may only be known to the individual members and/or the respective devices. Additionally, or alternatively, the meeting notes may be directly sent from the designated member's device to the other devices based on the incorporated identifiers (e.g., if the identifiers are associated with email accounts of the other attending members). Such direct transmission may, for instance, be performed during the meeting or anytime after the meeting.

More specifically, the system 100 may cause, at least in part, a detection, at a device, of presence of one or more other devices. Detection may, for instance, be perform using a variety of short-range wireless communication technologies, such as those of wireless fidelity (WiFi), near field communication (NFC), Bluetooth, infrared, or audio techniques (e.g., identification and/or detection through high-frequency audio signals). The system 100 may then process and/or facilitate a processing of wireless signal information, from the one or more other devices, to determine one or more identifiers associated with the one or more other devices. The one or more identifiers may, for instance, include one or more device identifiers, one or more account identifiers, one or more user identifiers, or a combination thereof. The system 100 may further cause, at least in part, an incorporation of at least one of the one or more identifiers in one or more captured content items. By way of example, the at least one of the one or more identifiers may be incorporated by the device, an associated service, or a combination thereof. The at least one or more identifiers may also be incorporated in the one or more captured content items as metadata. The one or more captured content items may include one or more media items, one or more documents, or a combination thereof. Moreover, the one or more captured content items may be captured at the device. As discussed, the incorporation of the at least one of the one or more identifiers may include an encryption of the at least one of the one or more identifiers, for instance, to protect the privacy, the security, etc., of users, user devices, and/or user accounts associated with the one or more identifiers.

As shown in FIG. 1, the system 100 comprises a user equipment (UE) 101 or multiple UEs 101a-101n having connectivity to the incorporation platform 103 via a communication network 105. The UE 101 may include or have access to an application 107 (e.g., applications 107a-107n) to enable the UE 101 to interact with, for instance, the incorporation platform 103 to detect presence of other devices, determine identifiers associated with the other devices, determine history information and location information associated with the identifiers, incorporate at least one of the identifiers in one or more captured content items, share captured content items, or perform other functions. The incorporation platform 103 may include or have access to an identifier database 109 to access or store identifier information, such as the incorporated identifiers, device identifiers, account identifiers, etc. The incorporation platform 103 may also include or have access to a content database 111 to access or store content information, such as the captured content items, other related content, etc. The identifier information and the content information may, for instance, be provided by the UEs 101, a service platform 113, one or more services 115 (or services 115a-115k), one or more content providers 117 (or content providers 117a-117m), and/or other services available over the communication network 105. For example, a particular service 115 may obtain content (e.g., media content) from a particular content provider 117 to offer the content to the UE 101. It is noted that the incorporation platform 103 may be a separate entity of the system 100, a part of the one or more services 115 of the service platform 113, or included within the UE 101 (e.g., as part of the application 107). In one example embodiment, the incorporation platform 103, the service platform 113, the one or more services 115a-115k, and/or the one or more content providers 117a-117m may be implemented in the same system, server and/or service provider.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, mobile phone, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). The UE 101 may also be embedded in, or separable attached to, any object or device, such as a vehicle (e.g., a car, truck, boat, or airplane), appliance, etc.

In another embodiment, the incorporation platform 103 may process and/or facilitate a processing of the one or more identifiers to determine history information associated with the one or more identifiers. The history information may, for instance, include one or more time periods corresponding to the detected presence of the one or more other devices. In a further embodiment, the incorporation of the at least one of the one or more identifiers is based on the history information.

By way of example, the at least one of the one or more identifiers may be selected for incorporation in the one or more captured content items based on the one or more time periods of the detected presence of the one or more other devices, for instance, with respect to the time the one or more captured content items are captured by the device.

In one scenario, a user may be taking a series of photographs of former classmates while attending a class reunion. Throughout the day, the user's device may detect the presence of her former classmates' devices. Based on the wireless signal information emitted from her former classmates' devices, the user's device may determine the identifiers associated with those devices. After the user has stopped taking photographs for a predetermined time period (e.g., one hour), the user's device may, for instance, be triggered by an associated service to start incorporating identifiers associated with devices detected during a time period between a predetermined time before the first captured photograph of the photograph series was taken and a predetermined time after the last captured photograph of the photograph series was taken. In this way, sharing of the photographs based on the identifiers may be limited to the individuals attending the class reunion. For example, when the photographs are uploaded to the associated service, the individuals at the class reunion may access the photographs taken by the user (as well as other photographs taken by other users at the class reunion) using their identifiers. However, other individuals, such as individuals not part of the class reunion (e.g., individuals associated with devices detected after the time period), would not be able to access those photographs using their identifiers. In another scenario, the incorporation of identifiers for a particular photograph may be restricted to identifiers associated with devices detected during a time period between a predetermined time before the particular photograph was taken and a predetermined time after the particular photograph was taken.

In another embodiment, the incorporation platform 103 may process and/or facilitate a processing of the one or more identifiers to determine location information associated with the one or more identifiers. The location information may, for instance, include one or more geographical distances of the one or more other devices from the device during the detected presence. In a further embodiment, the incorporation of the at least one of the one or more identifiers is based on the history information. By way of example, the at least one of the one or more identifiers may be selected for incorporation in the one or more captured content items based on the one or more geographical distances of the one or more other devices from the device during the detected presence. In the above class reunion scenario, for instance, the incorporation of the identifiers for the series of photographs may be limited to identifiers associated with devices that were within a certain geographic range of the user's device during the detected presence. As such, devices initially detected outside the geographic range may still be incorporated if, for instance, the devices are later detected within the geographic range within a predetermined time period. In a further scenario, the incorporation of the identifiers for a particular photograph may be limited to identifiers associated with devices detected within a certain geographic range of the user's device at the time the particular photograph is captured.

In another embodiment, the incorporation platform 103 may receive a request, from a requesting device, for the one or more captured content items. The request may, for instance, include at least one other identifier. The incorporation platform 103 may then determine that the at least one of the one or more identifiers includes the at least one other identifier.

The incorporation platform 103 may thus cause a sharing of the one or more captured content items with the requesting device, for instance, based on the determination that the at least one of the one or more identifiers includes the at least one other identifier. In one use case, a user may login to a sharing service to access photographs and videos taken at a particular event. The user's account may, for instance, be already been associated with the user's identifier. Thus, the login may initiate the request for the photographs and videos, and include the user's identifier in the request. The sharing service may then analyze the photographs and videos for the particular event by comparing the user's identifier with the identifiers incorporated in the respective photographs and videos. If, for instance, one of the identifiers incorporated in a particular photograph or video matches the user's identifier, the sharing service may then share the photograph or video to the user (e.g., by transmitting the photograph or video to the user's device). In a further embodiment, the at least one other identifier may be received in an encrypted format, and the determination that the at least one of the one or more identifiers includes the at least one other identifier may be based on a decryption of the encrypted at least one other identifier. As such, in the above scenario, the sharing service may have to decrypt an encrypted version of the user's identifier prior to the comparison (e.g., using a private and/or public key scheme). Moreover, because the incorporated identifiers in the captured content items may also be encrypted, the sharing service may have to decrypt the encrypted versions of the incorporated identifiers prior to the comparison. In this way, users and/or user devices may securely and/or anonymously send, store, and request captured content items.

In another embodiment, the incorporation platform 103 may cause a transmission of the one or more captured content items, one or more references to the one or more captured content items, or a combination thereof to at least one of the one or more other devices based on the at least one of the one or more identifiers. By way of example, the transmission of the one or more captured content items and/or the one or more references (e.g., uniform resource locator (URL)) may be from the device to the at least one of the one or more other devices. The transmission may, for instance, be performed based on a user action to transfer the one or more captured content items and/or the one or more references, or performed without such user action (e.g., automatic transmission from the device according to preference information associated with the user). The transmission may occur at the time the one or more captured content items are captured, sometime after the one or more captured content items are captured, or a combination thereof. In one scenario, the user's device, or an associated service, may determine contact information associated with incorporated identifiers. As such, the user's device, or the associated service, may deliver the captured content items and/or references to the captured content items to other users using the determined contact information, for instance, a predetermined time after the content items are captured. Additionally, or alternatively, the user's device, or the associated service, may transmit thumbnails, a list of available captured content items, etc., to the other users using the determined contact information, allowing them, for instance, to decide which captured content items to download at a later time. Moreover, the list of available captured content items (e.g., arranged chronologically) may also enable the other users to see available captured content items in real-time (e.g., real-time updates).

By way of example, the UE 101, the incorporation platform 103, the service platform 113, and the content providers 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
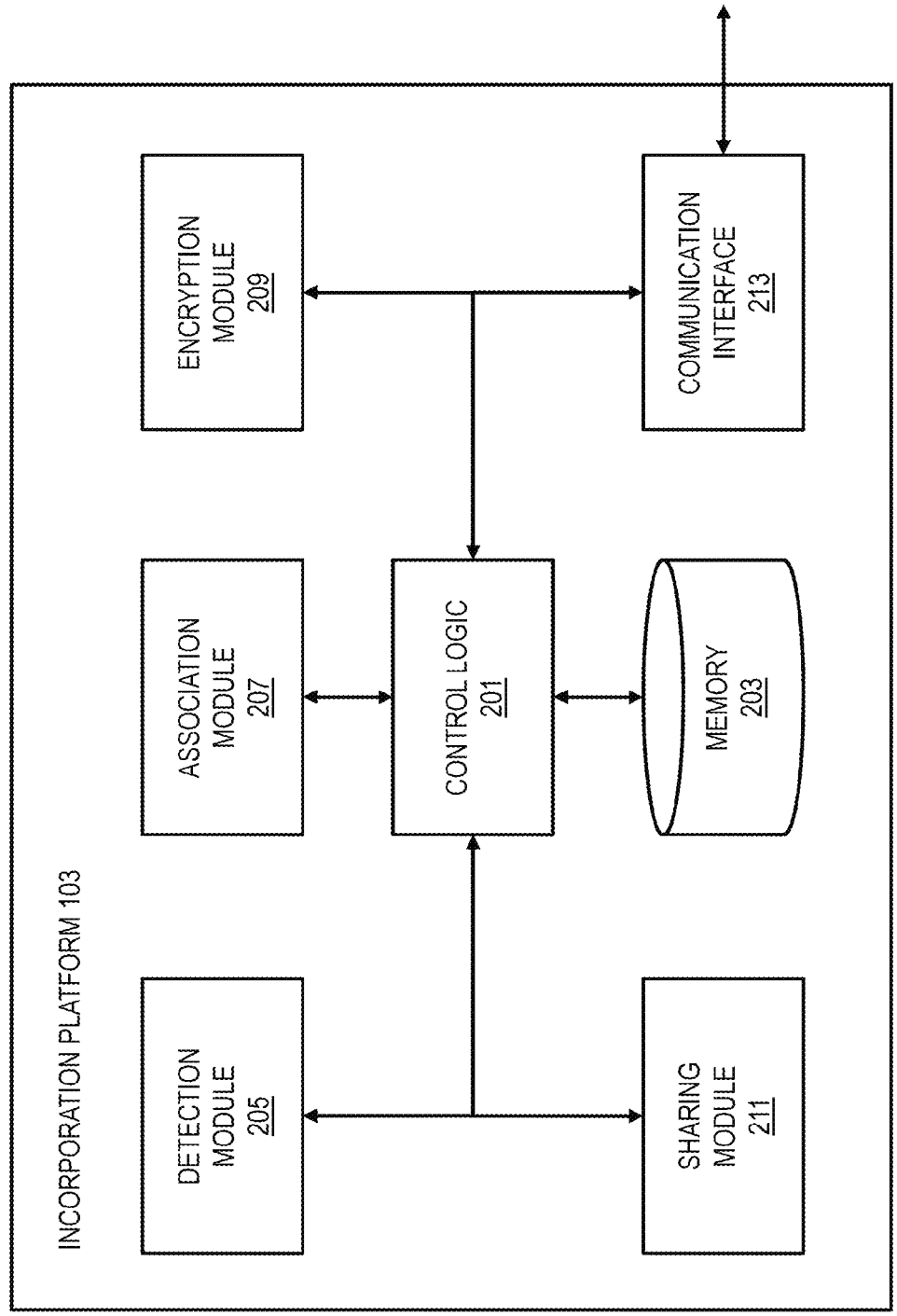
FIG. 2 is a diagram of the components of an incorporation platform, according to one example embodiment.

FIG. 2 is a diagram of the components of an incorporation platform, according to one embodiment. By way of example, the incorporation platform 103 includes one or more components for providing embedding of local identifiers. It is contemplated that the functions of these components may be combined in one or more components or performed by other components of equivalent functionality. In this embodiment, the incorporation platform 103 includes control logic 201, memory 203, a detection module 205, an association module 207, an encryption/decryption module 209, a sharing module 211, and a communication interface 213.

The control logic 201 executes at least one algorithm for executing functions of the incorporation platform 103. For example, the control logic 201 may interact with the detection module 205 to detect, at a device, presence of other devices and process wireless signal information from the other devices to determine identifiers associated with the other devices. As discussed, the detection may be performed using a variety of technologies, such as those of WiFi, NFC, Bluetooth, infrared, or audio techniques. The identifiers may, for instance, include device identifiers, account identifiers, etc.

The control logic 201 may then direct the association module 207 to initiate incorporation of the identifiers in captured content items, such as media items (e.g., images, videos, audio recordings, etc.) and/or documents (e.g., records, notes, messages, emails, etc.) captured by the device. As mentioned, the incorporation of the identifiers may include embedding an encrypted version of the identifiers, as metadata, in the captured content items for privacy or security reasons. Thus, the control logic 201 may work with the encryption/decryption module 209 to encrypt the identifiers prior to the incorporation of the identifiers in the captured content items.

The control logic 201 may additionally cause the sharing module 211 to initiate distribution of the captured content items, with or without an explicit user request, to those devices (or users) associated with the incorporated identifiers in the captured content items. As indicated, the device (e.g., the capturing device) may perform the transmission of the captured content items, for instance, by determining contact information associated with the incorporated identifiers and using the determined contact information to send the captured content items. Additionally, or alternatively, users associated with the incorporated identifiers may access a sharing service to request the captured content items using their respective identifiers, which may be encrypted.

The control logic 201 may also utilize the communication interface 213 to communicate with other components of the incorporation platform 103, the UEs 101, the service platform 113, the content providers 117, and other components of the system 100. For example, the communication interface 213 may initiate or perform the transmission of the captured content items, for the sharing module 211, based on the incorporated identifiers. The communication interface 213 may further include multiple means of communication. In one use case, the communication interface 213 may be able to communicate over short messaging service (SMS), MMS, internet protocol, instant messaging, email, voice sessions (e.g., via a phone network), or other types of communication.

Figure 3:
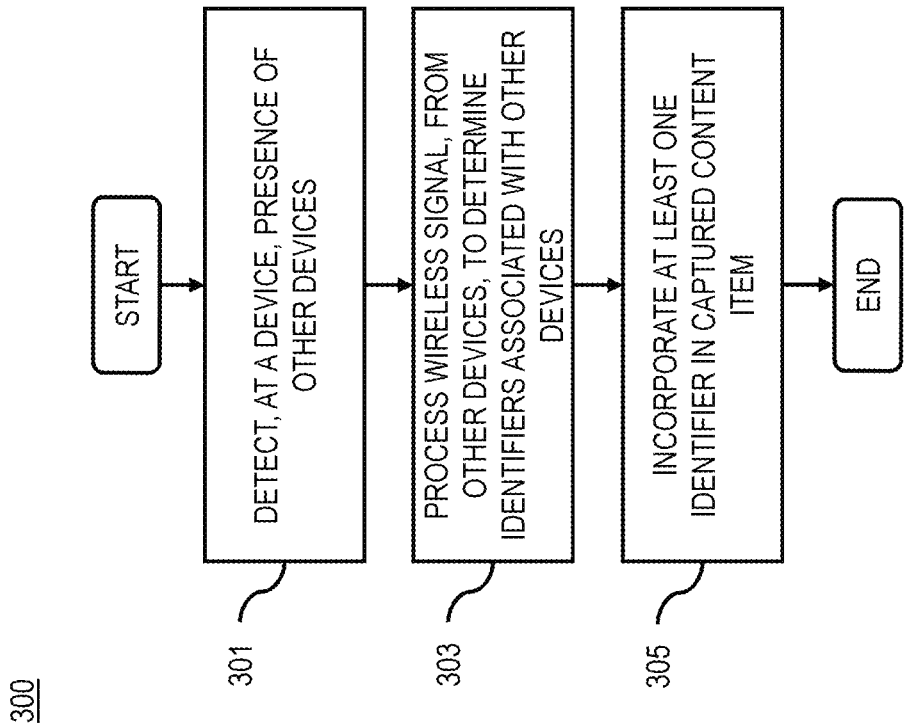
FIG. 3 is a flowchart of a process for providing embedding of local identifiers, according to one example embodiment.
Figure 9:
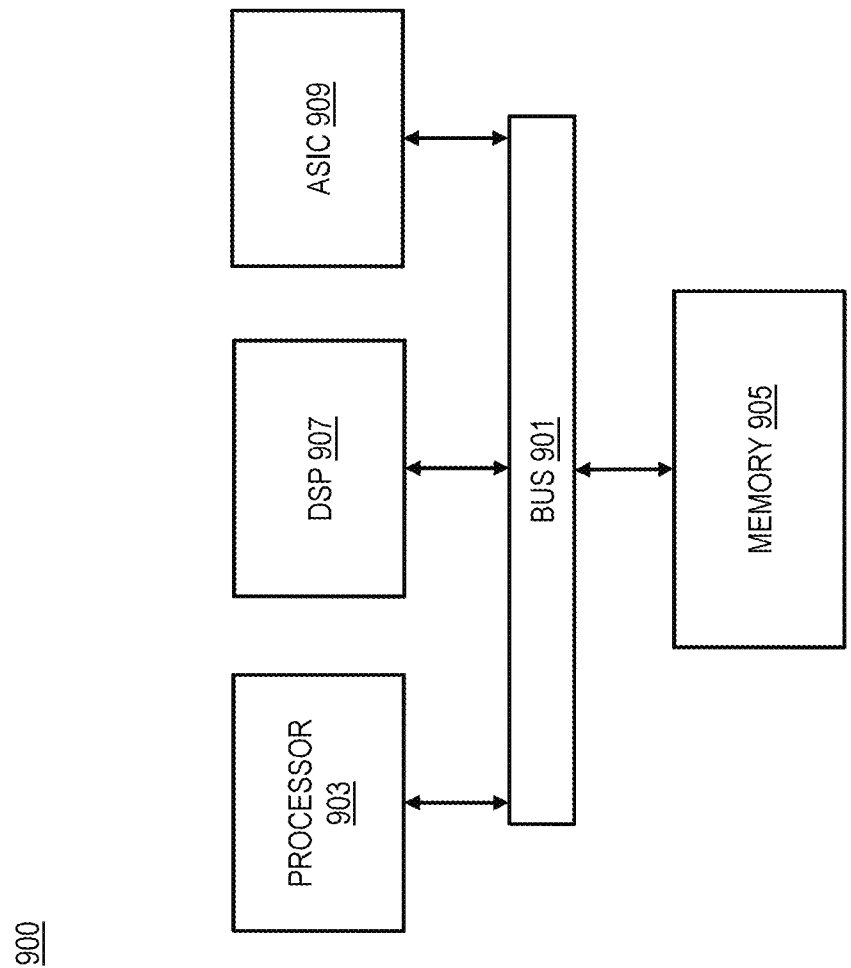
FIG. 9 is a diagram of a chip set that can be used to implement an example embodiment of the invention.

FIG. 3 is a flowchart of a process for providing embedding of local identifiers, according to one embodiment. In one embodiment, the incorporation platform 103 performs the process 300 and is implemented in, for instance, a chip set including a processor and a memory as shown in FIG. 9. As such, the control logic 201 can provide means for accomplishing various parts of the process 300 as well as means for accomplishing other processes in conjunction with other components of the incorporation platform 103.

In step 301, the control logic 201 may cause, at least in part, a detection, at a device, of presence of one or more other devices. As discussed, the detection may be performed using a variety of communication technologies, such as short-range wireless connections, like WiFi, NFC, Bluetooth, infrared, or audio techniques. In a meeting scenario, for instance, detection may be performed based on high-frequency audio signals emitted from the one or more other devices along with other detection techniques. However, because audio signals do not transmit, as easily as radio signals, through thin walls and windows, detection based on audio signals may used to limit the detection to those devices within the meeting room for privacy, security, or other reasons. In step 303, the control logic 201 may then process and/or facilitate a processing of wireless signal information, from the one or more other devices, to determine one or more identifiers associated with the one or more other devices. The identifiers may, for instance, include one or more device identifiers, one or more account identifiers, and/or one or more user identifiers. Additionally, or alternatively, some or all of the one or more identifiers may be encrypted, for instance, by the one or more devices.

In step 305, the control logic 201 may cause, at least in part, an incorporation of at least one of the one or more identifiers in one or more captured content items. As mentioned, the at least one of the one or more identifiers may be incorporated by the device and/or an associated service. The at least one or more identifiers may, for instance, be incorporated in the one or more captured content items as metadata. The one or more captured content items may include one or more media items, one or more documents, or a combination thereof. Moreover, the one or more captured content items may be captured at the device. As indicated, the incorporation of the at least one of the one or more identifiers may include an encryption of the at least one of the one or more identifiers, for instance, to protect the privacy, the security, etc., of users associated with the one or more identifiers.

Figure 4:
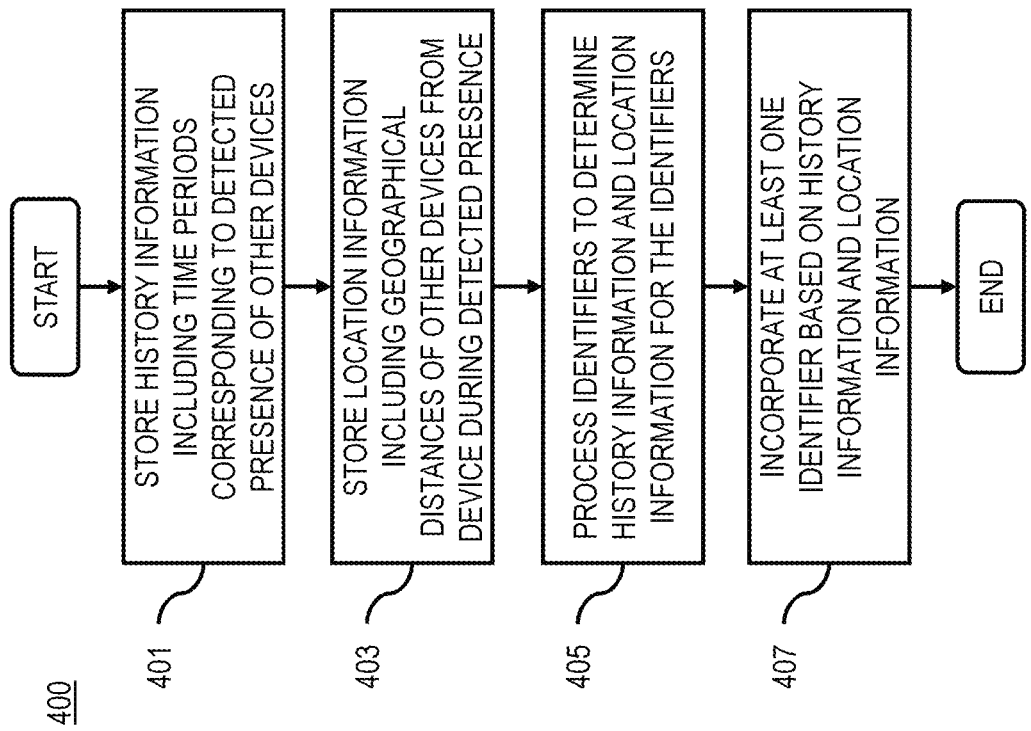
FIG. 4 is a flowchart of a process for using history information and location information to incorporate identifiers in content items, according to one example embodiment.

FIG. 4 is a flowchart of a process for using history information and location information to incorporate identifiers in content items, according to one embodiment. In one embodiment, the incorporation platform 103 performs the process 400 and is implemented in, for instance, a chip set including a processor and a memory as shown in FIG. 9. As such, the control logic 201 can provide means for accomplishing various parts of the process 400 as well as means for accomplishing other processes in conjunction with other components of the incorporation platform 103.

In step 401, the control logic 201 may determine to store history information associated with the one or more identifiers. The control logic 201 may also, as in step 403, determine to store location information associated with the one or more identifiers. By way of example, the history information and/or the location may be stored in a list, a database, etc., at the device and/or an associated service. The history information may include one or more time periods corresponding to the detected presence of the one or more other devices. The location information may include one or more geographical distances of the one or more other devices from the device during the detected presence.

Thus, in step 405, the control logic 201 may process and/or facilitate a processing of the one or more identifiers to determine the history information and the location information associated with the one or more identifiers, for instance, by comparing the identifiers with the information stored in the list, the database, etc. Accordingly, in step 407, the control logic 201 may cause an incorporation of the at least one of the one or more identifiers in the one or more captured content items based on the history information and the location information. By way of example, the at least one of the one or more identifiers may be selected for incorporation in the one or more captured content items based on the one or more time periods of the detected presence of the one or more other devices, for instance, with respect to the time the one or more captured content items are captured by the device and/or based on the one or more geographical distances of the one or more other devices from the device during the detected presence. Additionally, or alternatively, a portion of the history information and/or location information, such as the portion associated with the incorporated one or more identifiers may also be incorporated in the captured content items. As indicated, the incorporated portion and the incorporated one or more identifiers may include an encryption of at least some of the portion and/or at least one of the one or more identifiers, for instance, to protect the privacy, the security, etc., of users, user devices, and/or user accounts associated with the one or more information and/or identifiers.

Figure 5:
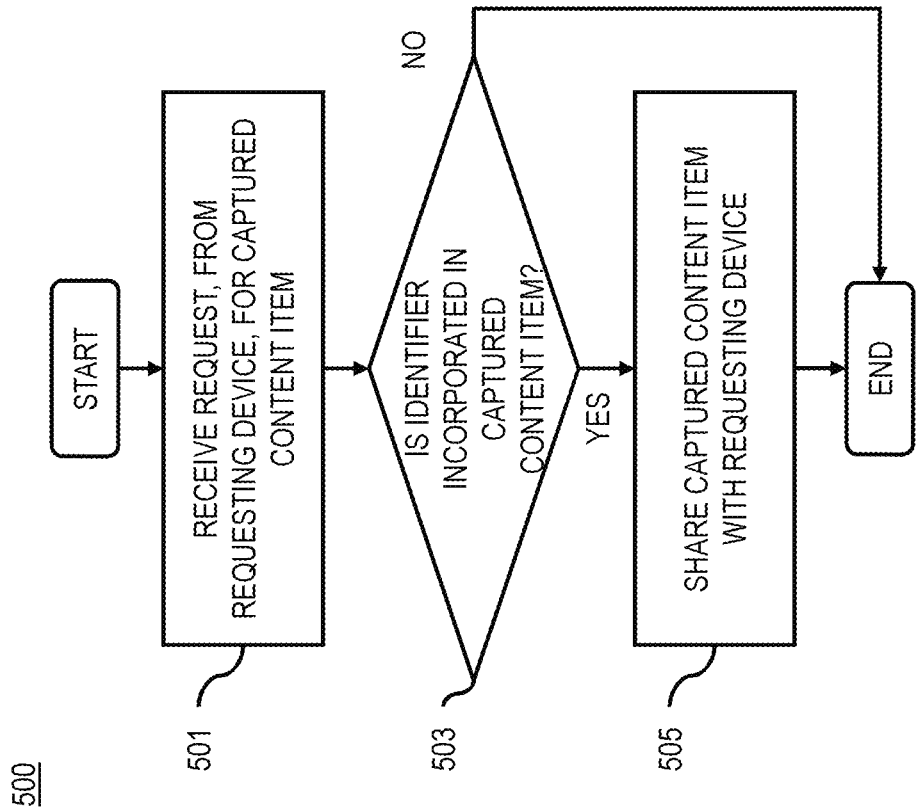
FIG. 5 is a flowchart of a process for sharing content items using incorporated identifiers, according to one example embodiment.

FIG. 5 is a flowchart of a process for sharing content items using incorporated identifiers, according to one embodiment. In one embodiment, the incorporation platform 103 performs the process 500 and is implemented in, for instance, a chip set including a processor and a memory as shown in FIG. 9. As such, the control logic 201 can provide means for accomplishing various parts of the process 500 as well as means for accomplishing other processes in conjunction with other components of the incorporation platform 103.

In step 501, the control logic 201 may receive a request, from a requesting device, for the one or more captured content items. The request may, for instance, include at least one other identifier. In one scenario, a user may access a sharing service to initiate the request from the user's device. As such, the request may include an identifier associated with the account that the user may have with the sharing service.

In step 503, the control logic 201 may determine whether the at least one of the one or more identifiers includes the at least one other identifier. If, for instance, it is determined that the at least one identifier is included in the at least one of the one or more identifiers, the control logic 201 may, as in step 505, cause a sharing of the one or more captured content items with the requesting device. In the above scenario, for instance, the sharing service may analyze captured content items to determine the incorporated identifiers associated with respective captured content items. The sharing service may then compare the incorporated identifiers with the identifiers included in the request to determine which of the captured content items can be shared, via the requesting device, to the requesting user. In some embodiments, the incorporated one or more identifiers and/or the at least one other identifiers included in the request are encrypted and must be decrypted, for instance, by the encryption/decryption module 209 of the incorporation platform 103 before the comparison (e.g. via the private and/or public key scheme).

FIG. 6 is a diagram illustrating an applicability of embedding local identifiers, according to one embodiment. Specifically, FIG. 6 illustrates users in a geographical area with their mobile devices (e.g., UEs 101a-101f). While the users are in the geographical area, an unidentified flying object (UFO) 601 appeared in the sky. Because the UFO 601 was only visible for a few moments, only the user associated with UE 101a was able to capture a photograph 603 of the UFO 601 before the UFO 601 disappeared. However, because the UE 101e has been set to automatically receive shared captured content and the UE 101e was detected within a particular time period of the capture of the photograph 603 and within a particular geographical distance (e.g., within the area 605) from the UE 101a, the UE 101e was able to receive a copy 607 of the photograph 603 immediately from the UE 101a (e.g., as indicated by notification 609) based on an identifier associated with the UE 101e.

In this scenario, the UEs 101b-101d have not been set to automatically receive shared captured content and, thus, while the UEs 101b-101d were also detected within a particular time period of the capture of the photograph 603 and within a particular geographical distance from the UE 101a, the UEs 101b-101d have not yet received a copy of the photograph 603. Nonetheless, the respective users of the UEs 101b-101d can access a copy of the photograph 603 at an associated service based on their respective identifiers when, for instance, a copy of the photograph 603 is uploaded to the associated service. The UE 101f, however, was not detected within the particular geographical distance from the UE 101a. As such, the identifier associated with the UE 101f was not incorporated in the photograph 603. Accordingly, the identifier associated with the UE 101f may not be utilized to access the photograph 603, for instance, from the associated service.

Figure 7A:
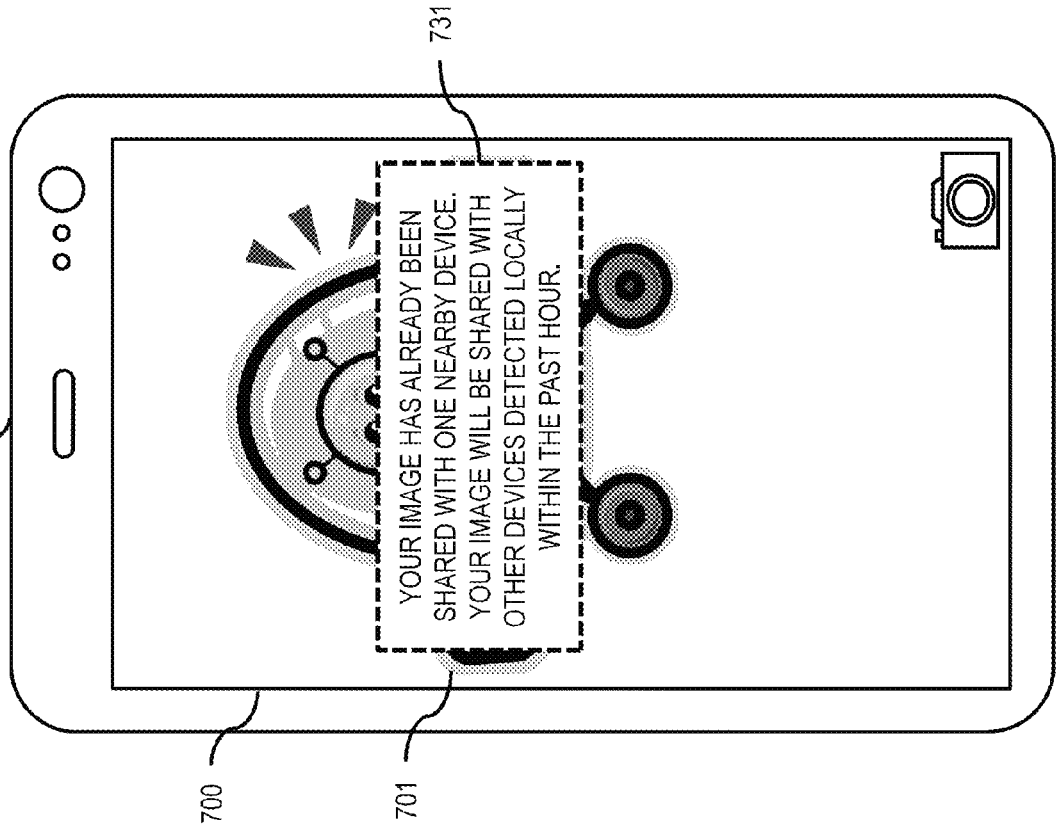
FIGS. 7A and 7B are diagrams of a user interface utilized in the processes of FIGS. 3 and 4, according to various example embodiments.
Figure 7B:
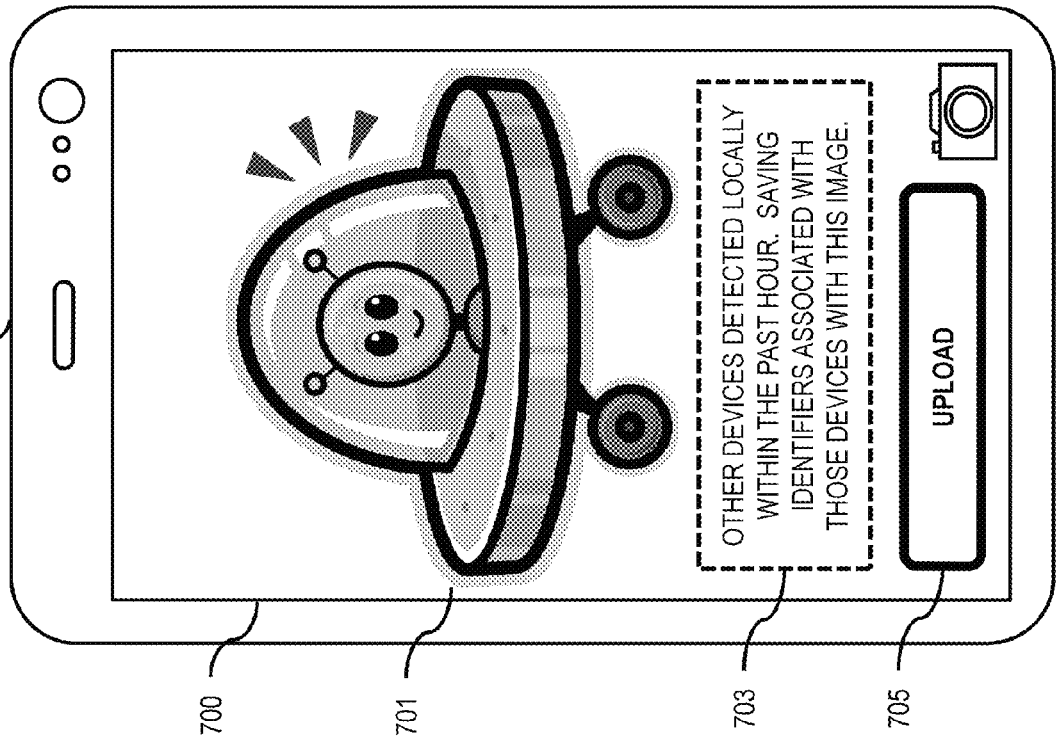

FIGS. 7A and 7B are diagrams of a user interface utilized in the processes of FIGS. 3 and 4, according to various embodiments. FIG. 7A features the UE 101a utilizing the user interface 700 (e.g., of a camera application), which illustrates the captured photograph of the UFO 701 (or the captured photograph 603 of the UFO 601). As shown, the user is presented with a notification 703 to alert the user that other devices were detected locally within the past hour and that the identifiers associated with those devices are being "saved" with the captured photograph. As indicated, in FIG. 6, the captured photograph has already been automatically shared with another device (e.g., UE 101*e*). Nonetheless, the user has an option 705 to upload the captured photograph, for instance, to an associated service to enable access to the captured photograph for other users. As illustrated in FIG. 7B, the user has selected the option 705. Thus, the user is presented with a notification 731 to alert the user that the captured photograph has already been shared with one nearby device (e.g., UE 101*e*) and that the captured photograph will be shared with the other devices locally detected within the past hour (e.g., UEs 101*a*-101*d*).

The processes described herein for providing embedding of local identifiers may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
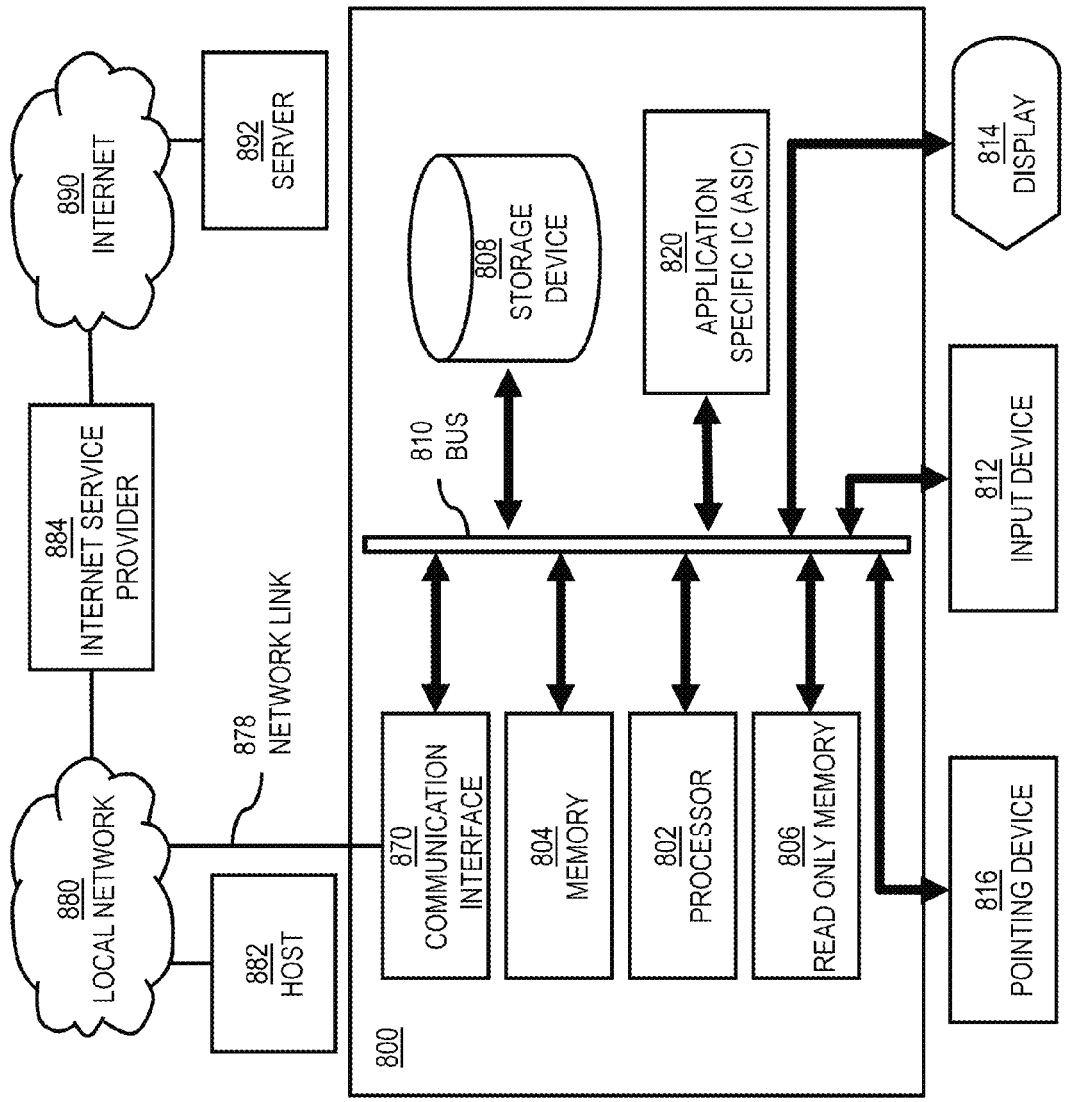
FIG. 8 is a diagram of hardware that can be used to implement an example embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide embedding of local identifiers as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing embedding of local identifiers.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing embedding of local identifiers. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing embedding of local identifiers. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing embedding of local identifiers, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. The sensor (or sensors) may include a variety of technologies and techniques, including a compass, an accelerometer, a motion sensor, a temperature sensor, an audio signal sensor, a radio signal sensor (e.g., radio frequency identification (RFID) readers), etc. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing embedding of local identifiers to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide embedding of local identifiers as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing embedding of local identifiers.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide embedding of local identifiers. The memory 905 also stores the data associated with or generated by the execution of the inventive steps.

Figure 10:
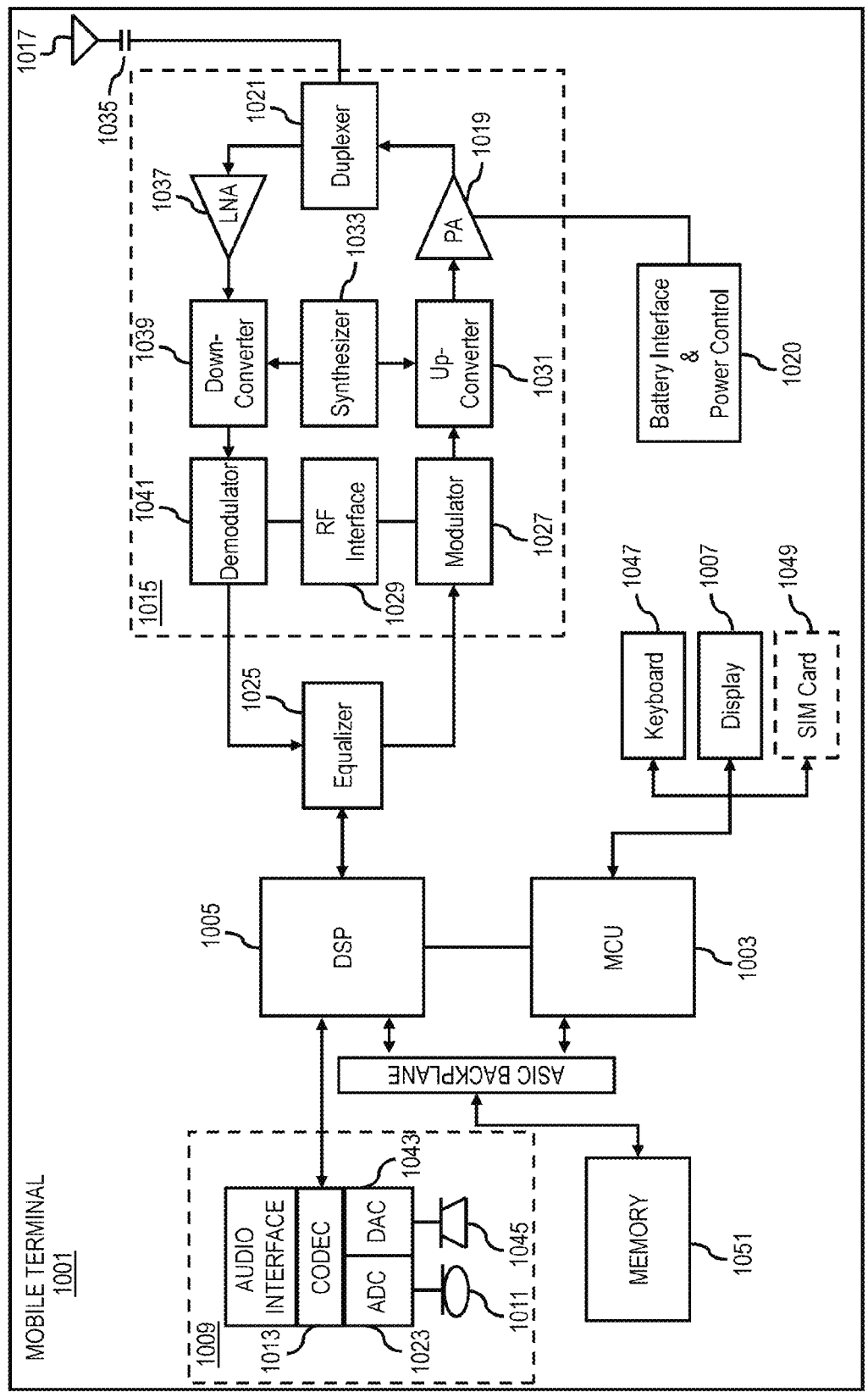
FIG. 10 is a diagram of a mobile terminal (e.g., handset) that can be used to implement an example embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing embedding of local identifiers. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing embedding of local identifiers. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide embedding of local identifiers. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

receiving, by an apparatus from a device, one or more captured content items captured by the device and one or more encrypted identifiers of one or more other devices detected as present within a short-range wireless communication range from a location of the device where the one or more captured content items were captured;

receiving a request, from one of the one or more other devices to the apparatus, for the one or more captured content items, the request including at least one other identifier;

causing, at least in part, a decryption of the one or more encrypted identifiers by the apparatus into one or more decrypted identifiers;

determining, by the apparatus, that at least one of the one or more decrypted identifiers includes, at least in part, the at least one other identifier; and processing the one or more decrypted identifiers to determine history information, location information, or a combination thereof, associated with the one or more decrypted identifiers, wherein the history information includes, at least in part, one or more time periods corresponding to a detected presence of the one or more other devices within the short-range wireless communication range, and the location information included, at least in part, one or more geographical distances of the one or more other devices from the device during the detected presence, wherein the one or more encrypted identifiers are associated with the one or more captured content items based, at least in part, on the history information, the location information, or a combination thereof, and wherein the device has no key information to decrypt the one or more encrypted identifiers, and the one or more other devices are anonymous to the device.

2. A method of claim 1, further comprising:

causing, at least in part, a transmission of the one or more captured content items to the one other device, based, at least in part, on the at least one determination.

3. A method of claim 2, wherein the one or more encrypted identifiers are encrypted at the one or more other devices with one or more respective private keys.

4. A method of claim 1, further comprising:

causing, at least in part, a streaming or broadcast of the one or more captured content items to the one other device.

5. A method of claim 1, further comprising:

causing, at least in part, a transmission of one or more references to the one or more captured content items to the one other device based, at least in part, on the determination.

6. A method of claim 1, wherein the one or more decrypted identifiers includes one or more device identifiers, one or more account identifiers, one or more user identifiers, or a combination thereof.

7. A method of claim 1, wherein the one or more captured content items include, at least in part, one or more media items, one or more documents, or a combination thereof; and wherein the at least one of the one or more encrypted identifiers is incorporated in the one or more captured content items as metadata.

8. A method of claim 1, wherein the one or more encrypted identifiers are encrypted based, at least in part, on one or more encryption keys at the one or more other devices respectively.

9. An apparatus comprising:

at least one processor; and at least one memory including computer program code for one or more programs, the at least one memory and the computer program code configured to, with the at least one processor, cause the apparatus to perform at least the following, receive, from a device, one or more captured content items captured by the device and one or more encrypted identifiers of one or more other devices detected as present within a short-range wireless communication range from a location of the device where one or more captured content items were captured;

receive a request, from one of the one or more other devices, for the one or more captured content items, the request including at least one other identifier;

decrypt the one or more encrypted identifiers into one or more decrypted identifiers;

determine that at least one of the one or more decrypted identifiers includes, at least in part, the at least one other identifier; and process the one or more decrypted identifiers to determine history information, location information, or a combination thereof, associated with the one or more decrypted identifiers, wherein the history information includes, at least in part, one or more time periods corresponding to a detected presence of the one or more other devices within the short-range wireless communication range, and the location information included, at least in part, one or more geographical distances of the one or more other devices from the device during the detected presence, wherein the one or more encrypted identifiers are associated with the one or more captured content items based, at least in part, on the history information, the location information, or a combination thereof, and wherein the device has no key information to decrypt the one or more encrypted identifiers, and the one or more other devices are anonymous to the device.

10. An apparatus of claim 9, wherein the at least one of the one or more encrypted identifiers is incorporated in the one or more captured content items as metadata.

11. An apparatus of claim 9, wherein the apparatus is further caused to:

cause, at least in part, a sharing of the one or more captured content items with the one other device.

12. An apparatus of claim 9, wherein the apparatus is further caused to:

cause, at least in part, a transmission of one or more references to the one or more captured content items to the one other device based, at least in part, on the determination.

13. An apparatus of claim 9, wherein the one or more encrypted identifiers are encrypted based, at least in part, on one or more encryption keys at the one or more other devices respectively.

14. An apparatus of claim 9, wherein the one or more decrypted identifiers includes one or more device identifiers, one or more account identifiers, one or more user identifiers, or a combination thereof.

15. An apparatus of claim 9, wherein the one or more captured content items include, at least in part, one or more media items, one or more documents, or a combination thereof.

* * * * *